US006419884B1

(12) United States Patent
Strobel et al.

(10) Patent No.: US 6,419,884 B1
(45) Date of Patent: Jul. 16, 2002

(54) REACTOR UNIT IN A SYSTEM FOR PRODUCING HYDROGEN-RICH GAS FROM A LIQUID RAW FUEL

(75) Inventors: Barbara Strobel, Dornstadt; Matthias Wolfsteiner, Alesheim, both of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/360,159

(22) Filed: Jul. 26, 1999

(30) Foreign Application Priority Data

Jul. 25, 1998 (DE) .......................... 198 33 644

(51) Int. Cl.[7] .............. B01J 8/04; F28D 1/03
(52) U.S. Cl. ............... 422/193; 422/188; 422/191; 422/198; 422/202
(58) Field of Search ................ 422/188, 191, 422/193, 198, 202

(56) References Cited

U.S. PATENT DOCUMENTS

| | | | | |
|---|---|---|---|---|
| 4,256,783 A | * | 3/1981 | Takada et al. | 422/197 |
| 4,873,368 A | | 10/1989 | Kadowski et al. | 562/532 |
| 5,270,127 A | * | 12/1993 | Koga et al. | 429/17 |
| 5,271,916 A | * | 12/1993 | Vanderborgh et al. | 423/246 |
| 5,534,328 A | * | 7/1996 | Ashmead et al. | 428/166 |
| 5,811,062 A | * | 9/1998 | Wegeng et al. | 422/129 |
| 5,985,178 A | * | 11/1999 | Long et al. | 252/373 |
| 5,989,503 A | * | 11/1999 | Wiesheu et al. | 422/198 |

FOREIGN PATENT DOCUMENTS

| | | |
|---|---|---|
| DE | 195 26 886 | 9/1996 |
| DE | 197 19 997 A1 | 5/1998 |
| DE | 197 53 720 | 6/1999 |
| EP | 0 529 329 A2 | 7/1992 |
| GB | 922259 | 3/1963 |

OTHER PUBLICATIONS

Minoru, "Plate Type Reformer", *Patent Abstracts of Japan*, Pub. No. 05105404, Pub. Date Apr. 27, 1993.
Minoru, "Plate Type Reformer", *Patent Abstracts of Japan*, Pub. No. 05105403, Pub. Date Apr. 27, 1993.
Minoru, "Plate Type Reformer", *Patent Abstracts of Japan*, Pub. No. 05105405, Pub. Date Apr. 27, 1993.

* cited by examiner

*Primary Examiner*—Marian C. Knode
*Assistant Examiner*—Alexa A. Doroshenk
(74) *Attorney, Agent, or Firm*—Crowell & Moring LLP

(57) ABSTRACT

A reactor unit in a system for the production of hydrogen-rich gas from a liquid raw fuel includes (1) a reaction chamber for a reaction medium and which contains a catalyst material; and (2) two tempering chambers separated from one another. The two tempering chambers are associated with different areas of the reaction chamber, so that within the reaction chamber two reaction zones are formed, which can be held at different temperature levels.

15 Claims, 2 Drawing Sheets

REACTOR UNIT IN A SYSTEM FOR PRODUCING HYDROGEN-RICH GAS FROM A LIQUID RAW FUEL

BACKGROUND AND SUMMARY OF THE INVENTION

This application claims the priority of German Patent Application No. 198 33 644.6, filed Jul. 25, 1998, the disclosure of which is expressly incorporated by reference herein.

The present invention relates to a reactor unit in a system for producing hydrogen-rich gas from a liquid raw fuel.

For the operation of fuel cells with polymer membranes (called "PEM fuel cells") for mobile applications, a hydrogen-rich gas can be produced from a liquid raw fuel, especially methanol, for example, by the reformation of steam:

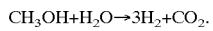

$$CH_3OH + H_2O \rightarrow 3H_2 + CO_2.$$

In this process, carbon monoxide is also produced as a byproduct in amounts which damage the PEM fuel cell. The reformer product gas must therefore be cleaned in a gas cleaning stage. Selective oxidation on a suitable oxidation catalyst is known as a possible approach to a solution. The oxidation of CO is highly exothermic.

In the course of a chemical reaction, it is often advantageous to establish a temperature change through the reaction zone. In the case of the highly exothermic CO oxidation, the CO content is reduced, resulting in lower CO concentrations. Thus, selectivity becomes poorer. It is also true that higher temperatures result in poorer selectivity. By lowering the temperature level in the rear portion of the reaction zone of a CO oxidator, the selectivity can be substantially improved. In the case of the endothermic reformation reaction, a reduction of the initial CO concentration can be achieved by a low temperature in the rear portion of the reaction zone of a reformer. The thermodynamic equilibrium of the exothermic water-gas shift reaction plays a part, which shifts toward greater CO concentrations at higher temperatures.

In known reactor systems for water-vapor reformation of hydrocarbon or CO oxidation, a single reactor is used at uniform temperature, or structurally separate reactor units are used to achieve the different temperature levels.

In the first case, no optimum adaptation to the reaction temperature is possible. In the second case, the result is a high volume and mass requirement.

In GB 922259, a reactor unit for the reformation of methanol or for the CO shift reaction is described in which the addition of steam for the shift reaction takes place outside of the actual reaction chamber in a plurality of heating chambers connected to the actual reaction chamber.

When water is added, the water is brought into direct contact with the reaction medium issuing from the reaction chamber, so that steam is formed, which is absorbed by the reaction medium. The reaction medium is then fed back into the reaction chamber to an additional catalyst bed. The addition of the water abruptly chills the reaction medium. This chilling can be utilized in controlling the temperature of the reaction at the catalyst bed.

A very similar reactor unit for the CO shift reaction is disclosed in DE 197 19 997 A1 in which several chambers separated from one another in the direction of flow are present into which water is injected. The choice of the water temperature can be used to control the temperature of the catalytic reaction.

In EP 0 529 329 A2, a reactor unit for the CO shift reaction is disclosed in which waste heat is carried away by means of two tempering media. The reaction chamber for the shift reaction is sandwiched between the chambers through which the tempering media flow.

It is an object of the present invention to create a reactor in which the reaction temperature can be optimally achieved for the particular reaction, thereby achieving a low volume and mass requirement.

This object is accomplished with a reactor unit according to the present invention. According to the present invention, two tempering chambers separate from one another and from the reaction chamber are integrated into a reactor unit of laminate construction, and are associated with different areas of the reaction chamber. Thus, two reaction zones, which can be held at different temperature levels, are formed within the reaction chamber.

The two tempering chambers can be constructed both as energy sinks and as energy sources regardless of the requirements of the course of the reaction. As an energy sink, the tempering chamber can be referred to as a cooling chamber. As an energy source, the tempering chamber is a heating chamber.

In one embodiment of the present invention, one tempering chamber carries a liquid tempering medium and the other tempering chamber carries a gaseous tempering medium, so that the two tempering chambers are part of a cooling or heating circuit.

In an alternative embodiment, a catalyst material can be present in the tempering chambers. By a special chemical reaction (endothermic or exothermic) on this catalyst, a specific temperature level can be achieved.

With the reactor unit according to the present invention, optimization of the reactor temperatures to the course of the reaction is achieved. Also, the magnitudes of different temperatures in the two reaction zones can be varied as needed.

The integration of two reaction stages, which formerly were structurally separate, in a single structural unit makes the reactor more compact. By constructing the reactor unit in a laminate design, the mass and volume are reduced by two end plates in comparison to the known, structurally separate reaction stages. At the same time, the reactor unit according to the present invention entails a significant cost reduction compared with the known reactors.

The reactor unit according to the present invention makes no great demands of the technique of its manufacture and therefore can be made simply and inexpensively.

The reactor unit according to the present invention can be used within a system for the production of a hydrogen-rich gas from a fluid raw fuel, especially for the reformation of hydrocarbons or water-gas shift reaction, or in the gas purification stage of the system for selective carbon monoxide oxidation. The reactor unit of the present invention can be used especially in a PEM fuel cell system for mobile applications.

Other objects, advantages and novel features of the present invention will become apparent from the following detailed description of the invention when considered in conjunction with the accompanying drawings.

DETAILED DESCRIPTION OF THE DRAWINGS

Figure 1:
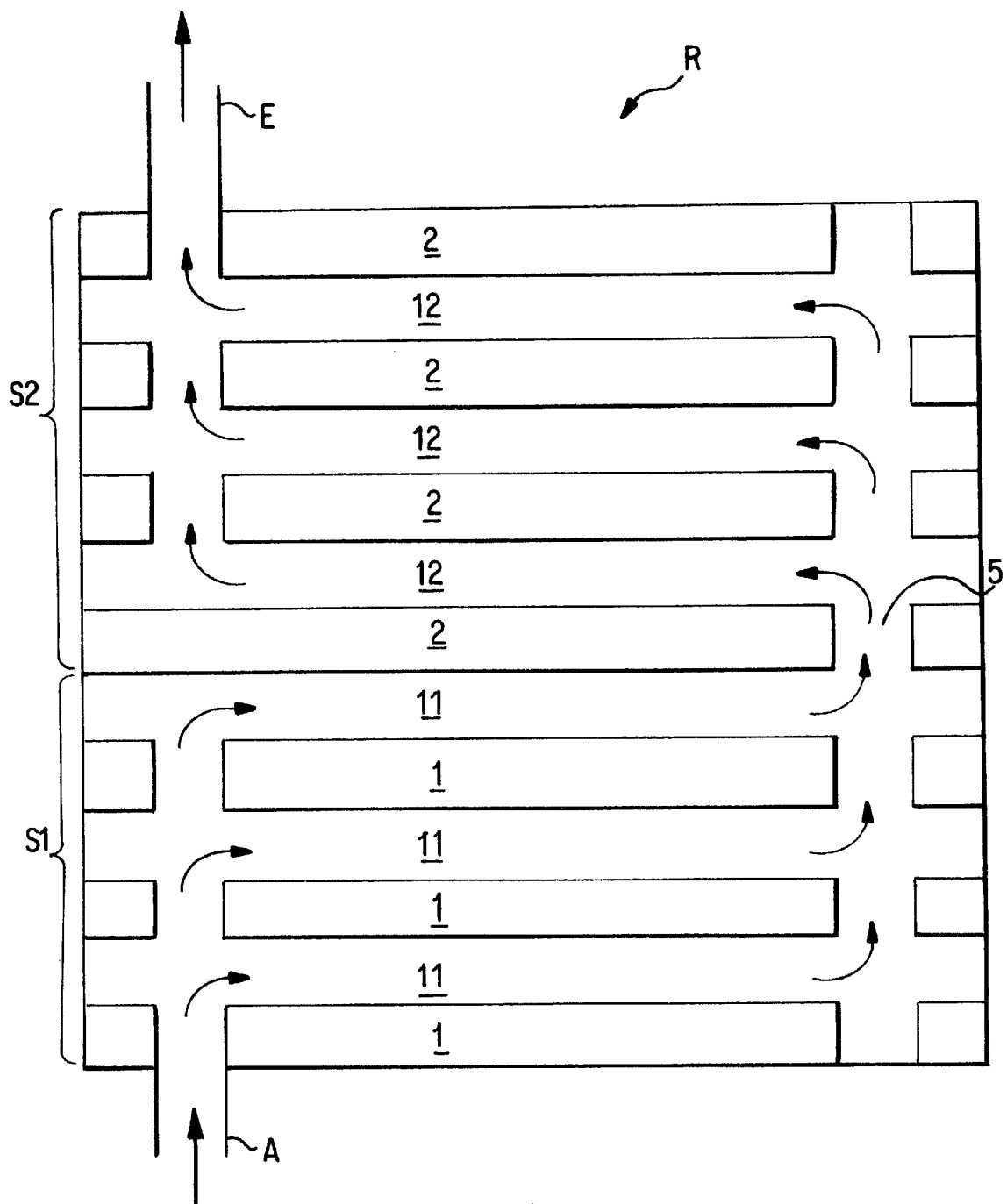
FIG. 1 is a sectional view of a reactor unit according to the invention showing guidance of the reaction medium.
Figure 2:
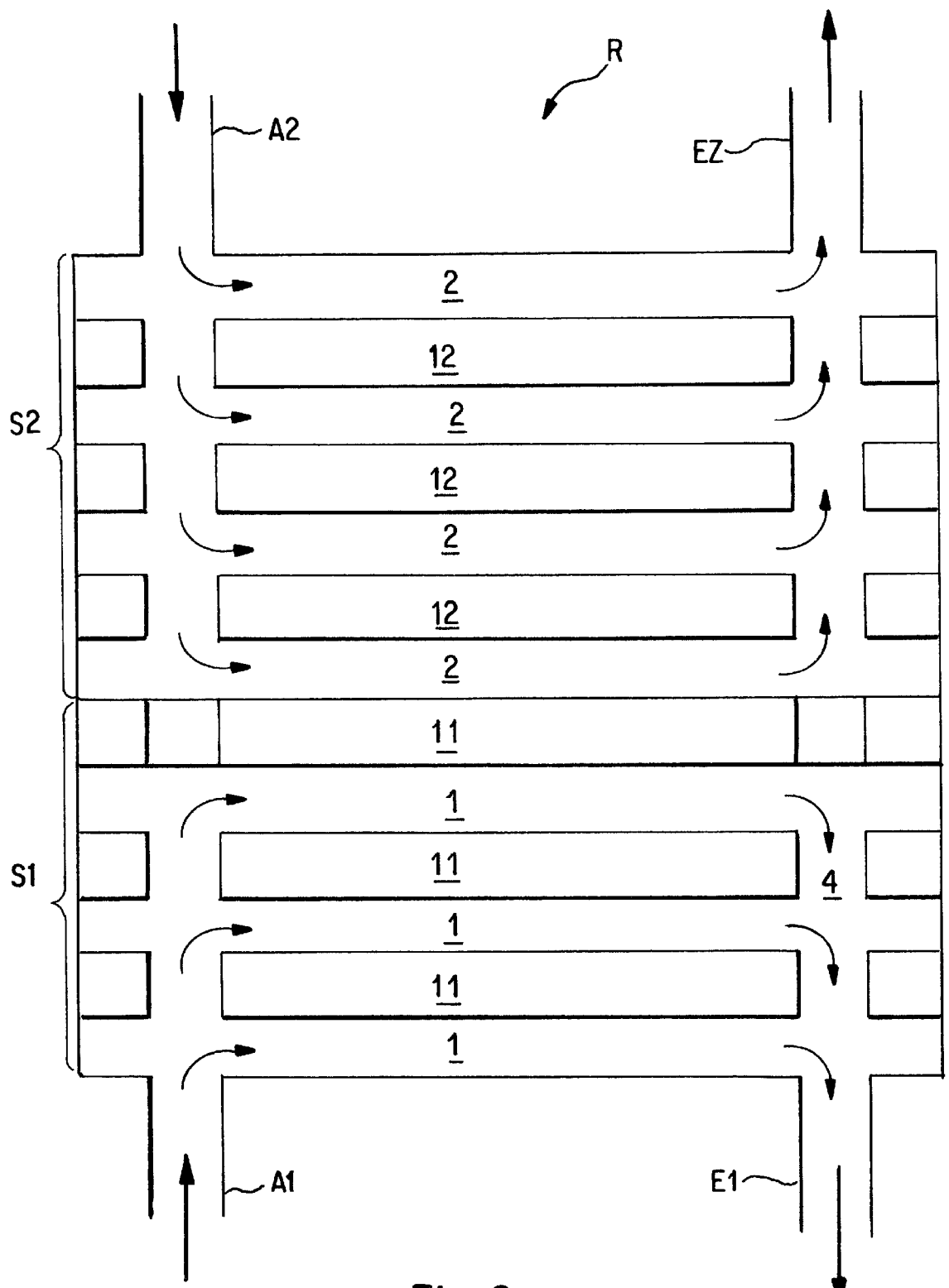
FIG. 2 is a sectional view of the reactor unit according to the present invention showing guidance of the tempering media.

In FIGS. 1 and 2, an embodiment of the reactor unit of the present invention is represented by way of example. In this embodiment, two tempering chambers each carry a tempering medium. The guidance of the reaction medium within the reaction chamber is shown in FIG. 1. The direction of flow of the reaction medium is indicated by arrows. FIG. 2 shows another section through the same reactor unit wherein the guidance of the tempering media within the two tempering chambers is indicated by arrows. []The reactor unit R is of laminate construction, wherein a plurality of plates embossed on one or both sides (not shown as individual parts in FIG. 1) are placed one on the other and provided with gaskets (not shown) to seal the media from one another and from the exterior. The individual plates can also be soldered or welded together. The embossing of the plates forms channels for carrying the reaction medium and the tempering media. On the walls of the channels carrying the reaction media, catalyst material is provided. The catalyst material may be section-wise, but can also be charged in the form of bulk material, such as pellets. The individual plates furthermore have openings for the inlet and outlet of the media. Such laminate modules are well known, as described in DE 196 17 396 A1, for example.

The reactor unit R in the embodiment shown comprises two stages S1 and S2 in series with one another and thereby form a compact structural unit. The reaction medium is fed through the inlet A into the first stage S1 and then passes through the individual catalyst-containing channels 11 of the reaction chamber. Then the reaction medium is carried through the passage 5 into the second stage S2 where is passes through the channels 12 of the reaction chamber and leaves the reactor unit R through the exit E.

The reactor unit R according to the present invention further comprises two tempering chambers separated from one another, each carrying a tempering medium. The tempering medium in the first tempering chamber can be different from the tempering medium in the second tempering chamber. Each tempering chamber is associated with a reactor stage S1 and S2, respectively. As shown in FIG. 2, the first tempering medium (its direction of flow indicated by arrows) is fed through the inlet A1 into the first stage S1 of the reactor unit; passes through the channels 1 of the first tempering chamber; and leaves the reactor unit R through the exit E1. The channels 1 of the first tempering chamber lie adjacent to the channels 11 of the reaction chamber, so that good thermal contact between reaction medium and tempering medium results.

Like the guidance of the first tempering medium, the second tempering medium is introduced through entry A2 into the second stage S2 of the reactor unit R; passes through the channels 2 of the second tempering chamber; and leaves the reactor unit through exit E2.

There is no connection between the channels 1 for the first tempering medium and the channels 2 for the second tempering medium. The two tempering media are thus carried separately from one another within the reactor unit R in different tempering chambers. The two tempering media can be carried countercurrently and/or in the same direction.

The result is (1) a reaction zone in the first stage S1 of the reactor unit in which a first temperature level can be established by means of the first tempering medium, and (2) a second reaction zone within the second stage S2 of the reactor unit, with any desired temperature level different from the first temperature level.

In embodiments, those fluids already present in the system can be advantageously used as tempering media. For is example, in the case of a fuel cell system, an oil circuit is available which is used for tempering of the endothermal methanol reforming reaction, and for the evaporation of water and methanol. The oil is first heated in a catalytic burner to a temperature T1 and then serves (1) for heating the reforming reactor (which need not be constructed according to the present invention), and (2) for the evaporation of the methanol and water, after which it is cooled to a lower temperature T2.

These two temperature levels T1 and T2 of the oil can be used for the tempering of a reactor unit according to the present invention for CO oxidation. After leaving the catalytic burner, the oil with the temperature T1 is carried into the first tempering chamber of the CO oxidation reactor unit. After that, the oil is carried into the reforming reactor and then into the evaporator. The oil is then at the temperature level T2 and is carried into the second tempering chamber of the CO oxidation reactor.

In another embodiment (not shown), the reactor unit according to the present invention comprises an apparatus for internal blowing of air, for example, into the reaction chamber. For example, a feed line carrying the oxidizing gas can extend directly into the manifold channel 4 for the removal of the reaction gas within the first reactor stage S1.

The catalyst materials within the reaction chamber can be the same or different in stage 1 and stage 2, depending on the reaction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reactor unit in a system for the production of a hydrogen-rich gas from liquid fuel, comprising:
   a reaction chamber comprising a plurality of channels, each channel containing a catalyst material, wherein a reaction medium flows (a) from an inlet of the reaction chamber through a plurality of channels in a first reaction zone, (b) through a single passage into a second reaction zone, and (c) countercurrently through a plurality of channels in the second reaction zone to an outlet of the reaction chamber;
   a first tempering chamber comprising a plurality of channels for carrying a tempering medium and which is adjacent to the first reaction zone, wherein the tempering medium flows from an inlet in the first tempering chamber through the plurality of channels to an outlet of the first tempering chamber;
   a separate second tempering chamber comprising a plurality of channels for carrying a tempering medium and which is adjacent to the second reaction zone, wherein the tempering medium flows from an inlet in the second tempering chamber through the plurality of channels to an outlet of the second tempering chamber,
   wherein the reaction chamber and the first and second tempering chambers have a laminate construction, so that the reaction medium and the tempering media are separate from each other.

2. A reactor unit according to claim 1, wherein said reaction zones have different temperature levels.

3. A reactor unit according to claim 1, wherein at least one tempering chamber forms a section of a tempering-medium circuit.

4. A reactor unit according to claim 1, wherein at least one tempering chamber further comprises a catalyst material that sets a specific temperature level by catalyzing a chemical reaction.

5. A reactor unit according to claim 1, wherein the reaction zones of the reaction chamber comprise different catalyst materials.

6. A reactor unit according to claim 1, the reaction zones comprise the same catalyst material.

7. A reactor unit according to claim 1, wherein the catalyst material in the reaction chamber is a selective CO oxidation catalyst.

8. A reactor unit according to claim 1, wherein the catalyst material in the reaction chamber a hydrocarbon reformation catalyst.

9. A reactor unit according to claim 1, wherein the catalyst material in the reaction chamber is a water gas-shift reaction catalyst.

10. A reactor unit according to claim 1, further comprising means for feeding an oxidizing gas into the reaction chamber.

11. A reactor unit according to claim 1, wherein the reactor unit is configured as a laminate module.

12. A polymer membrane fuel cell system comprising a reactor unit according to claim 1.

13. A reactor unit according to claim 1, wherein each tempering chamber carries a different tempering medium and the different tempering media remain separated from one another.

14. A reactor unit according to claim 1, wherein one tempering chamber is a cooling chamber and the other tempering chamber is a heating chamber.

15. A reactor unit according to claim 1, wherein one tempering chamber contains a liquid medium and the other tempering chamber contains a gaseous medium.

* * * * *